Sept. 4, 1934. G. H. THACHER 1,972,721
VALVE
Filed Feb. 25, 1932 2 Sheets-Sheet 1
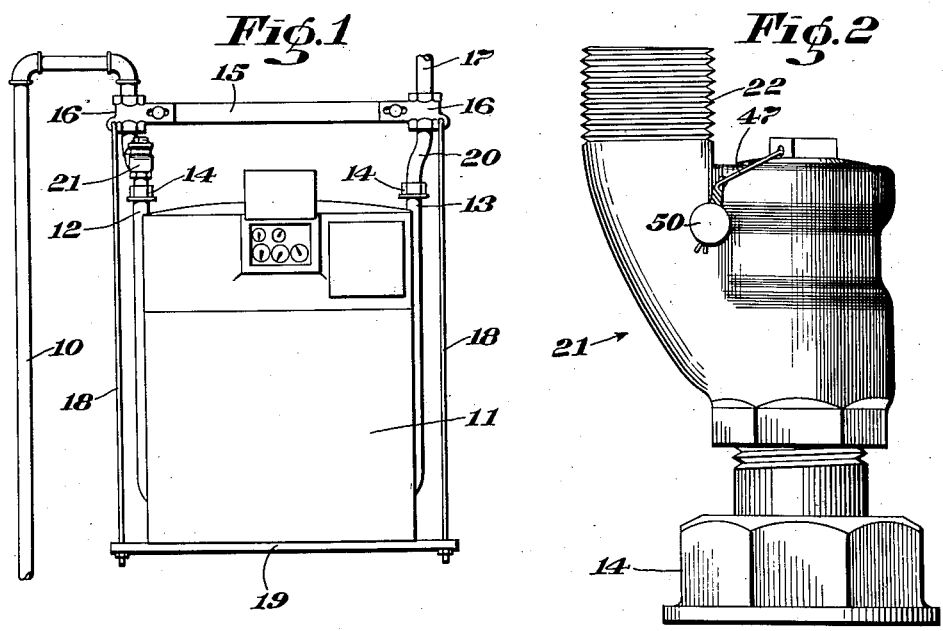
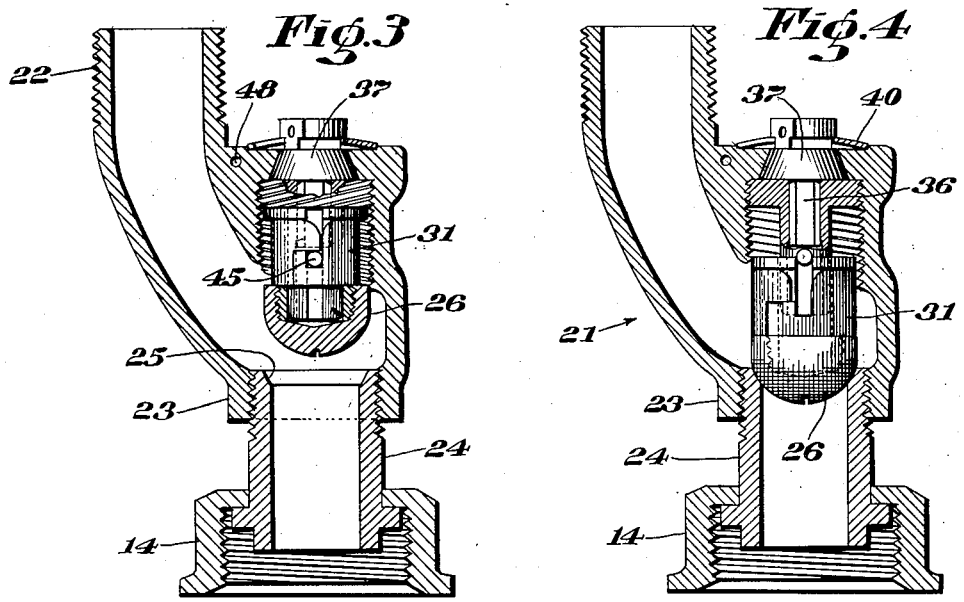
INVENTOR
George H. Thacher
BY Robt. P. Hains
ATTORNEY Sept. 4, 1934.   G. H. THACHER   1,972,721
VALVE
Filed Feb. 25, 1932   2 Sheets-Sheet 2
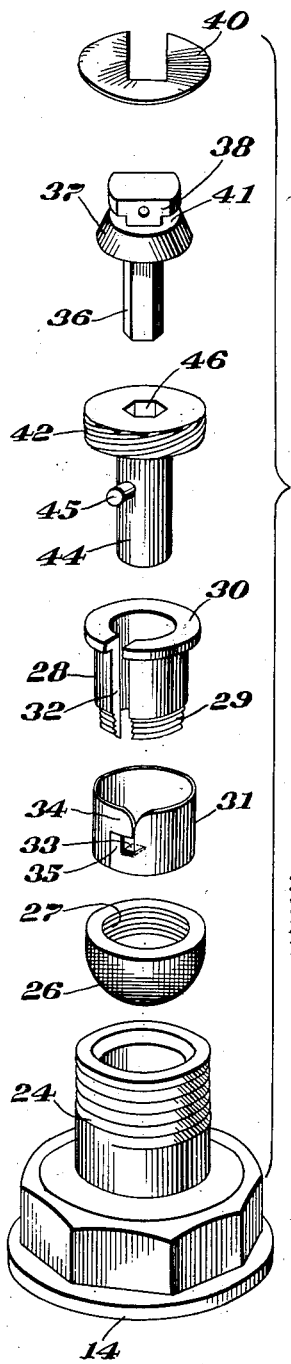
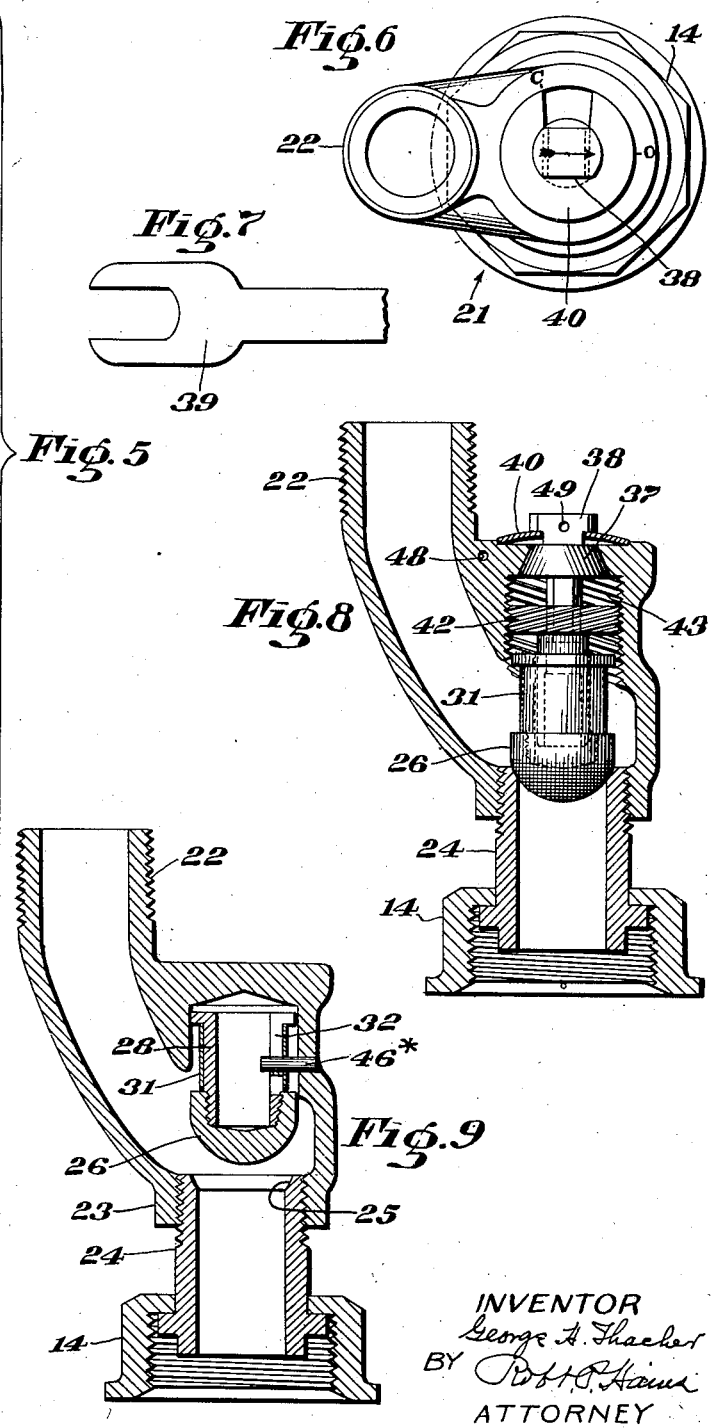
INVENTOR
George H. Thacher
BY
ATTORNEY Patented Sept. 4, 1934

1,972,721

UNITED STATES PATENT OFFICE 1,972,721

VALVE

George H. Thacher, Melrose, Mass.

Application February 25, 1932, Serial No. 595,147

13 Claims. (Cl. 137—161)

This invention relates to emergency valves operable to close automatically in case of fire, and also to combined shut-off and emergency or temperature controlled valves.

The common practice of employing pipe lines to supply illuminating gas and other combustible fluids to homes and other buildings creates an added hazard in case of fire, due to the fact that if the pipe line becomes broken it will deliver a continuous stream of the combustible fluid to the fire.

It has, therefore, been proposed heretofore to provide pipe lines for combustible fluids with valves that will close automatically in case of fire, and in these prior constructions heretofore solder of low fusing point has been commonly employed to retain the valve open. Such low fusing solder, however, tends to deteriorate with the passage of time and is open to other objections.

It has also been proposed heretofore to provide pipe lines with cooperating shut-off and temperature controlled valves, one valve being manually operated and a second valve automatically operated in case of fire.

The present invention relates to improvements in the above mentioned types of valves, and one important feature of the present invention resides in an emergency valve adapted to close automatically in case of fire or at a predetermined temperature, and includes in its construction an expansion ring preferably made of bimetal and adapted to expand sufficiently to release the valve at a predetermined temperature so that the valve may close. Through the employment of a sensitive expansion ring, as herein contemplated, a thoroughly reliable construction is secured that may be depended upon to operate within a range of very few degrees of the desired temperature control.

Another feature of the present invention resides in a combined shut-off and temperature control valve wherein a single valve element is manually operable to open and close the valve, and is also operable to close automatically upon exposure to a predetermined temperature. As a result of this construction a more simple arrangement is secured than in the prior constructions in which two valves have been provided, one constituting the shut-off valve and the other the temperature controlled valve.

A further feature of the present invention resides in a swivel pipe connection adapted for use to connect a gas meter to the supply pipe and having mounted therein a valve operable as a temperature controlled valve to cut off the supply of gas in case of fire, and also operable as a shut-off cock to manually control the supply of gas to the meter. As a result of this combined swivel pipe connection and valve of the present invention it is a simple and inexpensive operation to equip gas meters with a combined shut-off and emergency closing valve, since all that is necessary is to remove the connecting swivel with which the previously installed meter may have been provided and substitute in its place the present combined swivel, shut-off and emergency valve.

Other features of the invention and novel combination of parts in addition to the above will be hereinafter described in connection with the accompanying drawings which illustrate good practical forms thereof.

In the drawings:—

Fig. 1 is a front elevation of a gas meter having the valve of the present invention associated therewith;

Fig. 2 on a larger scale is a side elevation of the valve of the present invention;

Fig. 3 is a vertical sectional view through the valve casing of Fig. 2 showing the valve open;

Fig. 4 is a view similar to Fig. 3 showing the valve closed by the temperature controlled means;

Fig. 5 is a perspective view showing the cooperating valve parts disassembled;

Fig. 6 is a top view of Fig. 2;

Fig. 7 is a plan view of a wrench for manually operating the valve;

Fig. 8 is a view similar to Fig. 3 showing the valve closed manually; and

Fig. 9 is a view similar to Fig. 3 but shows a modified construction.

The valve of the present invention may be used in connection with pipe lines conducting various combustible fluids, and is shown as connected to the inlet pipe line 10 for the ordinary gas meter 11 installed in a house or other building. The meter 11 is shown as having the usual inlet connection 12 and outlet connection 13, each adapted to receive a coupling nut 14. The meter which may be installed in the cellar or other desired location is shown as supported by the usual bracket 15 having bolted thereto the pipe couplings 16, one of which is connected to the inlet pipe 10 and the other to the outlet pipe 17. Rods 18 extending downwardly from the couplings 16 may be provided to support the base plate 19 upon which the meter rests.

The outlet 13 is shown as connected to the coupling 16 by a swivel pipe connection 20 of well known construction. The parts so far described have been used heretofore as standard gas meter equipment and the swivel connection 20 between the parts 13 and 16 facilitates lateral adjustment of the meter relative to the coupling 16 during installation.

The valve of the present invention is designed so that it may be readily used in connection with the standard equipment above described, and may be easily and quickly installed by simply removing the swivel pipe connection, similar to the connection 20, from the inlet side of the meter and installing in its place the valve of the present invention. To this end the valve casing 21 of the present invention has an offset threaded end portion or nipple 22, adapted to be screwed into the inlet coupling 16, and its opposite end is provided with a coupling nut 14 adapted to be screwed onto the inlet connection 12, as shown in Fig. 1.

The valve casing 21 is provided at its lower end with the internally threaded nipple 23 adapted to receive the coupling sleeve 24 having the valve seat 25 at its inner end, and the nipples 22 and 23 are axially offset one from the other, similar to the opposite end of the swivel pipe connection 20.

The portion of the casing 21 in alignment with the nipple 23 is enlarged somewhat, as shown, to form an annular chamber therein large enough to receive the valve proper 26 and to accommodate its movement to and from the valve seat 25. The valve 26, as shown, has a rounded lower end and is internally threaded at 27 to receive the hollow valve stem 28. This stem is threaded at its lower end, as at 29, and is provided at its upper end with the annular flange 30.

The construction of the valve 26 and stem 28 serves to provide an annular groove lying between the valve 26 and flange 30 of the stem and adapted to receive the split expansion ring 31.

This ring is preferably formed of bimetal having unequal expansion properties, and rotation of the ring 31 upon the stem 28 is readily prevented by providing the stem with the longitudinal slot 32 adapted to receive a projection 33 extending inwardly into the slot from the ring. The split ring 31 is provided at one end with a pin engaging lip 34, and at its opposite end with a pin engaging shoulder 35 and pin receiving recess formed by bending the projection 33 inwardly.

The construction of the expansion ring 31 is such that it is adapted to cooperate with a laterally extending pin supported at the interior of the casing and positioned to normally hold the valve 26 in the open position, but when the valve parts are subjected to a predetermined temperature the ring 31 will expand sufficiently to release the supported pin and allow the valve to drop under its own weight upon the seat 25.

The temperature controlled valve so far described may be employed in connection with manually actuated means operable at will to open and close the valve, as shown in Figs. 1 to 8 inclusive, or the automatically closing valve may be used without the manually closing feature, as shown in the modified construction of Fig. 9.

In the embodiment of the invention shown in Figs. 1 to 8 inclusive, and directed to a combined manually operable shut-off and temperature controlled valve, the means for manually operating the valve is housed largely within the casing 21 and comprises a valve turning post 36 which is six sided or non-circular in cross section, as shown. The upper portion of this post 36 has the enlarged tapered head 37 adapted to be journaled in a similarly shaped bore formed in the upper end of the valve casing, and the opposite faces of the head may be slabbed off, as at 38, to receive the operating wrench 39. The tapered head 37 is held seated in the bore in which it rotates by a slotted spring washer 40 adapted to engage in the annular groove 41 of the head, and the outer periphery of this washer rests in an annular groove formed at the upper end of the valve casing. This forms a tight joint that prevents gas from escaping through the journal for the head 37.

The post 36 in the construction shown is adapted to rotate a valve carrying nut 42 which is screwed into the internally threaded portion 43 of the valve casing and the nut is shown as having a four-lead rapid travel thread adapted to advance it quickly along the threads 43, so that the valve may be moved from its wide open to its closed position by rotating the post 36 through about three-fourths of one complete turn.

The nut 42 has the downwardly extending portion 44 provided with the laterally extending pin 45 and the nut is provided with the socket 46 adapted to slidably receive the operating post 36. The cylinder portion 44 of the nut is adapted to slide freely into the hollow stem 28 so as to cause the pin 45 to move downwardly within the slot 32 into locking engagement with the expansion ring 31, as will be apparent from Fig. 3.

It will be seen from the foregoing that when the valve is open, as shown in Fig. 3, the valve stem 28 is held locked to the nut 42 by the cooperating pin 45 and expansion ring 31, and the flow of gas may pass freely from the pipe 10 to the meter 11. If a fire occurs near the meter the heating of the valve parts will cause the ring 31 to expand and release the valve 26 to permit it to close automatically, as shown in Fig. 4.

If it should be desired to manually close the valve when the parts are in the position of Fig. 3 this is readily accomplished by operating the wrench 39 to rotate the post 36, and the upper end of the valve casing may be provided with the letter "C" for "closed" and "O" for "open" to cooperate with the arrow at the upper end of the post to show whether the valve is open or closed.

Since the post 36 fits telescopically within the nut 42 and the projection 44 of the nut fits telescopically within the stem 28, the valve is guided by the parts 36 and 44 throughout its movement. By providing the ring 31 with the pin embracing shoulder 35 movement of this end of the split ring is prevented so that the entire expansion action of the ring is utilized to move the lip 34 to one side of the pin 45 so as to release the valve. As a result of this construction the ring may be designed to effect the automatic closure of the valve at any desired temperature, and when the valve has closed automatically the pin 45 may be reengaged with the ring 31 by simply turning the post 36 to its valve closing position.

In some constructions it may be desirable to employ the automatic closing feature of the present invention without the hand-operated shut-off feature. This is readily accomplished by omitting the post 36 and valve operating nut 42 of Fig. 5, and providing a pin 46* extending inwardly from a side wall of the casing as shown in Fig. 9, so that the ring 31 will cooperate with this pin, similar to the pin 45, to hold the valve open during normal atmospheric temperatures and is adapted to release the valve to close automatically in case of fire.

After the valve has been turned to the closed position of Fig. 8 it may be desirable to prevent the same from being opened again by an unauthorized person. This may be accomplished by placing a wire 47 through the holes 48 and 49 and then securing the ends of the wire together by a seal 50.

What is claimed is:—

1. An emergency valve adapted to close automatically at a predetermined temperature, comprising in combination, a valve casing having a valve seat, a valve within the casing, and means in the casing for normally holding the valve open and in position to close automatically when released, including a split expansion ring and cooperating pin arranged to hold the valve open during atmospheric temperatures but to release the valve at a predetermined higher temperature.

2. An emergency valve adapted to close automatically at a predetermined temperature, comprising in combination, a valve casing having a valve seat, a valve within the casing, and means in the casing for normally holding the valve open and in position to close automatically when released, including an expansion ring mounted on the valve to move therewith and a cooperating pin adapted to hold the valve open during atmospheric temperatures but to release the valve at a predetermined higher temperature.

3. An emergency valve adapted to close automatically at a predetermined temperature, comprising in combination, a valve casing having a valve seat, a valve within the casing, a supporting and guiding projection for the valve, and means for normally holding the valve open and in position to close automatically when released, including said projection and an expansion ring that surrounds said valve and projection and is constructed to expand and release the valve when subjected to a predetermined temperature.

4. An emergency valve adapted to close automatically at a predetermined temperature, comprising in combination, a valve casing having a valve seat, a valve within the casing and having a stem projecting therefrom, and means for normally holding the valve open and in position to close automatically when released, including an expansion ring encircling the stem and a pin engaging said ring to normally hold the valve open but to release the valve when subjected to a predetermined temperature.

5. An emergency valve adapted to close automatically at a predetermined temperature, comprising in combination, a valve casing having a valve seat, a valve within the casing and having a stem projecting therefrom, a member projecting inwardly from the casing into cooperating relation with said stem, and a split expansion ring adapted to cooperate with the stem and said member to hold the valve open and constructed to release the valve when subjected to a predetermined temperature to permit the valve to close automatically.

6. An emergency valve adapted to close automatically at a predetermined temperature, comprising in combination, a valve casing having a valve seat, a valve within the casing adapted to close automatically when released, and means for normally holding the valve open including a stem provided with a ring receiving groove, an expansion ring surrounding said stem and mounted in said groove a pin to support the said ring and valve in the open position during atmospheric temperatures and adapted to release the valve at a predetermined higher temperature.

7. An emergency valve adapted to close automatically in case of fire, comprising in combination, a valve casing having a valve seat, a valve within the casing adapted to close automatically when released and having a stem projecting therefrom, a projection extending inwardly from a wall of the casing, and an expansion ring mounted concentric with the axis of said valve and adapted to cooperate with said stem and projection to hold the valve open and operable to release the valve to effect its closure when subjected to a predetermined temperature.

8. An emergency valve adapted to close automatically at a predetermined temperature, comprising in combination, a valve casing having a valve seat, a valve within the casing adapted to close automatically when released, and means for supporting the valve from the casing in its open position including a split expansion ring and cooperating pin one of which is attached to the valve and the other to the casing, and the ring being adapted to expand sufficiently when subjected to a predetermined temperature to cause the slit of the ring to clear the pin and permit the valve to close.

9. An emergency valve adapted to close automatically at a predetermined temperature, comprising in combination, a valve casing having a valve seat, a valve within the casing adapted to close automatically when released, and means for supporting the valve from the casing in its open position including a split expansion ring and cooperating pin one of which is attached to the valve and the other to the casing, and the ring being provided at its slit with a pin engaging lip adapted to move out of engagement with the pin to release the valve as the ring expands.

10. An emergency valve adapted to close automatically at a predetermined temperature, comprising in combination, a valve casing having a valve seat, a valve within the casing adapted to close automatically when released, and means for supporting the valve from the casing in its open position including a split expansion ring and cooperating pin one of which is attached to the valve and the other to the casing, and the ring being provided at one side of its slit with a pin engaging lip and at the opposite side with a pin embracing portion which portion prevents its end of the ring from moving relative to the pin while the lip is being moved out of engagement with the pin by the ring expansion.

11. A combined shut-off and temperature controlled valve, comprising in combination, a valve casing having a valve seat, a normally open valve within the casing and constructed and arranged to be engaged with said seat automatically when subjected to a predetermined temperature and manually at will, including a manually operable threaded member for moving the valve to and from its seat, and a temperature responsive expansion member for securing the valve to said threaded member and operable by expansion to release the valve to close automatically.

12. A combined shut-off and temperature controlled valve, comprising in combination, a valve casing having a valve seat, a normally open valve within the casing, a threaded member connected to the valve, a post journaled in the valve casing for telescopic connection with said threaded member and adapted to be rotated to move the valve and threaded member relative to said seat, and temperature responsive means for connecting the valve to said threaded member and operable to release the valve therefrom to close automatically.

13. A combined shut-off and temperature controlled valve, comprising in combination, a valve casing having a valve seat, a normally open valve within the case and provided with a hollow stem projecting therefrom, a post rotatably mounted in said casing a valve carrying nut engaged by said post and having an extending portion projecting into said stem to move the latter towards and from the valve seat when said nut is rotated by said post, and a temperature controlled expansion ring for connecting the valve stem and said extending portion and operable to release the valve to close automatically.

GEORGE H. THACHER.